(12) United States Patent
Salem et al.

(10) Patent No.: US 8,935,643 B2
(45) Date of Patent: Jan. 13, 2015

(54) PARAMETER MATCHING HOTSPOT DETECTION

(75) Inventors: Rami Fathy Salem, Windsor (CA); Haitham Mohamad Abd ElHamid Eissa, Cairo (EG); Mohamed Al-Imam Mohamed Selim, Cairo (EG)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/267,874

(22) Filed: Oct. 6, 2011

(65) Prior Publication Data

US 2013/0091479 A1    Apr. 11, 2013

(51) Int. Cl.
*G06F 17/50* (2006.01)

(52) U.S. Cl.
CPC ........ *G06F 17/5081* (2013.01); *G06F 2217/12* (2013.01)
USPC ........................................... 716/112

(58) Field of Classification Search
CPC ................................. G06F 17/30; G06F 17/50
USPC ........................................... 716/112
See application file for complete search history.

(56) References Cited

U.S. PATENT DOCUMENTS

| | | | |
|---|---|---|---|
| 6,083,275 A | | 7/2000 | Heng et al. |
| 7,725,845 B1 | | 5/2010 | White et al. |
| 7,784,019 B1 | | 8/2010 | Zach |
| 8,584,072 B1 | | 11/2013 | Gopalakrishnan et al. |
| 8,612,921 B1 | | 12/2013 | Gopalakrishnan et al. |
| 2006/0271907 A1 | * | 11/2006 | Izuha et al. ..................... 716/21 |
| 2007/0018209 A1 | * | 1/2007 | Sahara et al. ................. 257/288 |
| 2007/0052963 A1 | * | 3/2007 | Orbon et al. .................. 356/430 |
| 2007/0266362 A1 | * | 11/2007 | Lai et al. .......................... 716/19 |
| 2009/0222785 A1 | * | 9/2009 | Cheng et al. ................... 716/19 |
| 2009/0300561 A1 | | 12/2009 | Tong et al. |
| 2011/0099529 A1 | * | 4/2011 | Heng et al. .................... 716/106 |
| 2012/0054694 A1 | | 3/2012 | Hamouda |
| 2014/0089877 A1 | | 3/2014 | Salem et al. |

OTHER PUBLICATIONS

J.K. et al., "Hotspot detection on post-opc layout using full chip simulation based on verification tool: A case study with aerial image simulation," SPIE, 2003.
E. R. et al., "Automated full-chip hotspot detection and removal flow for interconnect layers of cell-based designs," SPIE, 2007.
P. Gupta, A. Kahng, D. Sylvester, and J. Yang, "Performance-driven OPC for mask cost reduction," CM/IEEE International Symposium on Quality Electronic Design, pp. 270-275, 2005.
S. Banerjee, P. Elakkumanan, L. Liebmann, J. C. M., and Orshansky, "Electrically driven optical proximity correction," SPIE, 2008.

(Continued)

*Primary Examiner* — Vuthe Siek
*Assistant Examiner* — Mohammed Alam
(74) *Attorney, Agent, or Firm* — Klarquist Sparkman, LLP

(57) ABSTRACT

Disclosed are techniques for detecting hotspots using parameter matching. According to various implementations of the invention, devices in an electronic circuit design are classified into device groups based on their values for one or more device parameters, which can be derived from layout data describing the devices. Representative electrical information for each of the device groups is determined and used as a basis for hotspot detection.

20 Claims, 4 Drawing Sheets

(56) References Cited

OTHER PUBLICATIONS

B. Yongchan, S. Sundareswaran, and D. Pan, "Total sensitivity based DFM optimization of standard library cells," Proceedings of the 19th international symposium on Physical design, pp. 113-120, 2010.

D. Ding, A. J. Torres, F. G. Pikus, and D. Z. Pan, "High performance lithographic hotspot detection using hierarchically refined machine learning," Design Automation Conference (ASP-DAC), 2011 16th Asia and South Pacific, 2011.

D. Ding, X. Wu, J. Ghosh, and D. Z. Pan, "Machine learning based lithographic hotspot detection with critical feature extraction and classification," ICICDT Conf., 2009.

D. G. Drmanac, F. Liu, and L. Wang, "Predicting variability in nanoscale lithography processes," Design Automation Conf., 2009.

A. J. Torres, M. Hofmann, and O. Otto, "Directional 2D functions as models for fast layout pattern transfer verification," SPIE, 2009.

Azuma et al., "Methodology of MOSFET Characteristics Fluctuations Description Using BSIM3v3 SPICE Model for Statistical Circuit Simulations," *Proc. Int. Workshop Stat. Metrol. Tech. Papers*, pp. 14-17 (1998).

Batterywala et al., "Cell Swapping Based Migration Methodology for Analog and Custom Layouts," *Proc. 9th Int. Symp. Quality Electron. Design*, pp. 450-455 (Mar. 2008).

Bhattacharya, "On Efficient and Robust Constraint Generation for Practical Layout Legalization," *Proc. 9th Int. Symp. Quality Electron. Design.*, pp. 379-384 (Mar. 2008).

Bianchi et al., "Accurate Modeling of Trench Isolation Induced Mechanical Effects on MOSFET Electrical Performance," *Proc. Electron Dev. Meet. Int.*, pp. 117-120 (2002).

Brandenburg et al., "DFM: Where's the Proof of Value?" *Proc. Design Autom. Conf.*, pp. 1061-1062 (2006).

Drennan et al., "Implications of Proximity Effects for Analog Design," *Proc. Custom Integr. Circuits Conf.* (Sep. 2006).

Eissa et al., "Physical Aware Design Methodology for Analog and Mixed Signal Integrated Circuits," *Proc. of IEEE Int. Design Test Workshop*, pp. 1-5 (Nov. 2009).

Felt et al., "Performance-Driven Compaction for Analog Integrated Circuits," *Proc. Custom Integr. Circuits Conf.*, pp. 1-5 (May 1993).

Francken et al., "Methodology for Analog Technology Porting Including Performance Tuning," *Proc. IEEE Int. Symp. Circuits Syst.*, pp. 415-418 (Jul. 1999).

Gielen et al., "ISAAC: A Symbolic Simulator for Analog Integrated Circuits," *IEEE J. Solid-State Circuits*, vol. 24, No. 6, pp. 1587-1597 (Dec. 1989).

Graeb et al., "Analog Layout Synthesis—Recent Advances in Topological Approaches," *EDAA* (2009).

Gupta et al., "Self-Compensating Design for Focus Variation," *Proc. Design Autom. Conf.*, pp. 365-368 (2005).

Gupta et al., "Toward a systematic-variation aware timing methodology," *Proc. Design Autom. Conf.*, pp. 321-326 (Jul. 2004).

Hammouda et al., "Chameleon ART: A Non-Optimization Based Analog Design Migration Framework," *Proc. Design Autom. Conf.*, pp. 885-888 (2006).

Kahng et al., "Exploiting STI Stress for Performance," *Proc. IEEE Int. Conf. Comput. Aided Design*, pp. 83-90 (Nov. 2007).

Kahng, "Key Directions and a Roadmap for Electrical Design for Manufacturability," *Proc. Solid State Circuits Conf.*, pp. 83-88 (2007).

Kundu et al., "A Methodology for Efficient Design of Analog Circuits Using an Automated Simulation Based Synthesis Tool," *Proc. IEEE Int. Symp. Circuits Syst.*, pp. 732-735 (May 2008).

Lewyn, "Physical Design and Reliability Issues in Nanoscale Analog CMOS Technologies," *Proc. NORCHIP*, pp. 1-10 (2009).

Nassif, "Modeling and Analysis of Manufacturing Variations," *Proc. IEEE Custom Integr. Circuits*, pp. 223-228 (2001).

Poppe et al. "From Poly Line to Transistor: Building BSIM Models for Non-Rectangular Transistors," *Proc. SPIE*, vol. 6156, pp. 235-243 (Mar. 2006).

Postnikov et al., "Evaluation of Critical Dimension Control Requirements in the ITRS Using Statistical Simulation and Error Budgets," Motorola (2002).

Reed, "Electrical-DFM: Focusing on What Matters to Chip Designers," *Proc. Chip Design Tools Technol. Methodol.*, pp. 1-6 (2006).

Robertson, "E-DFM: The future of Parametric Yield Success," *Proc. Chip Design Tools Technol. Methodol.*, pp. 1-10 (2007).

Said et al., "A Novel General Graph-Based Simplex Algorithm Applied to IC Layout Compaction and Migration," *Proc. 2nd Int. Design Test Workshop*, pp. 241-246 (Dec. 2007).

Salem et al., "An Automated Methodology for Implementing a DFM-Aware Standard Cell Library Under Process Window and Context Variations," *Proc. IEEE 8th Int. NEWCAS Conf.*, pp. 21-24 (Jun. 2010).

Segura et al., "Parametric Failures in CMOS ICs: A Defect-Based Analysis," *Proc. IEEE Int. Test Conf.*, pp. 90-99 (2002).

Singal et al., "Modeling and Analysis of the Nonrectangular Gate Effect for Postlithography Circuit Simulation," *IEEE Trans. Very Large Scale Integr. (VLSI) Syst.*, vol. 18, No. 4, pp. 666-670 (Apr. 2010).

Su et al, "A Scaleable Model for STI Mechanical Stress Effect on Layout Dependence of MOS Electrical Characteristics," *Proc. IEEE Custom Integr. Circuits Conf.*, pp. 245-248 (2003).

Tan et al., "Effect of Shallow Trench Isolation Induced Stress on CMOS Transistor Mismatch," *Proc. IEEE Int. Conf Semicond. Electron.*, pp. 1-10 (Dec. 2004).

Wang et al., "Effect of Layout Orientation on the Performance and Reliability of High Voltage N-LDMOS in Standard Submicron Logic STI CMOS Process," *Proc. Reliab. Phys. Symp.*, pp. 654-655 (Apr. 2005).

Wu et al. "Physical-Based Threshold Voltage and Mobility Models Including Shallow Trench Isolation Stress Effect on nMOSFETs," *IEEE Trans. Nanotechnol.*, vol. 10, No. 4, pp. 875-880 (Jul. 2011).

Xi et al., BSIM4.3.0 MOSFET Model—Users Manual, Department of Electrical Engineering and Computer Sciences, University of California, Berkeley, CA, 194 pp. (2003).

Zhu et al., "The Calligrapher: A New Layout-Migration Engine for Hard Intellectual Property Libraries," *IEEE Trans. Comput-Aided Design Integr. Circuits Syst.*, vol. 24, No. 98, pp. 1347-1361 (Sep. 2005).

\* cited by examiner

PARAMETER MATCHING HOTSPOT DETECTION

FIELD OF THE INVENTION

The present invention relates to the field of lithography. Various implementations of the invention may be useful for detecting hotspots in circuit designs.

BACKGROUND OF THE INVENTION

Many microdevices, such as integrated circuits, have become so complex that these devices cannot be manually designed. For example, even a simple microprocessor may have millions and millions of transistors that cooperate to form the components of the microprocessor. As a result, electronic design automation tools have been created to assist circuit designers in analyzing a circuit design before it is manufactured. These electronic design automation tools typically will execute one or more electronic design automation (EDA) processes to verify that the circuit design complies with specified requirements, identify problems in the design, modify the circuit design to improve its manufacturability, or some combination thereof. For example, some electronic design automation tools may provide one or more processes for simulating the operation of a circuit manufactured from a circuit design to verify that the design will provides the desired functionality. Still other electronic design automation tools may alternately or additionally provide one or more processes for confirming that a circuit design matches the intended circuit schematic, for identifying portions of a circuit design that do not comply with preferred design conventions, for identifying flaws or other weaknesses the design, or for modifying the circuit design to address any of these issues. Examples of electronic design automation tools include the Calibre® family of software tools available from Mentor Graphics Corporation of Wilsonville, Oreg.

As electronic devices continue to have smaller and smaller features and become more complex, greater sophistication is being demanded from electronic design automation tools. For example, manufacturing technology faces increasing challenges related to yield, reliability, and leakage and timing variability. These challenges have led to a host of design for manufacturability (DFM) techniques because process improvements alone are not sufficient. The early DFM applications address yield issues caused by random defects and catastrophic failures. These process-based, or physical, DFM solutions identify and correct design areas that are vulnerable to functional failures, such as shorts and opens. These defective design areas are often referred to as hotspots.

At 65 nm and below, parametric failures become the dominant yield-limiting mechanism. Manufacturing variations affecting power, timing, or other performance specifications cause parametric yield loss. These failure mechanisms are addressed by the next generation of DFM solutions, Electrical DFM (EDFM). One of the main functions for EDFM tools is to identify hotspots related to parametric failures. Conventional approaches utilize full chip electrical simulations along with calculation of electrical property variations for each transistor due to manufacturing variations. For a relatively small chip with 23,000 transistors, however, the electrical DC current simulation alone consumes one hour. It is desirable to have a fast hotspot detection method.

BRIEF SUMMARY OF THE INVENTION

Aspects of the invention relate to techniques for detecting hotspots using parameter matching. According to various implementations of the invention, devices in an electronic circuit design are classified into device groups based on their values for one or more device parameters, which can be derived from layout data describing the devices. The one or more device parameters may be selected based on hotspot types or electrical properties of interest. If the devices are transistors, for example, the device parameters may comprise one or more of channel width, channel length, SA parameter, SB parameter, and other parameters. After the devices are grouped, electrical information for each of the device groups is determined and used as a basis for hotspot detection. In some embodiments of the invention, a reference device is selected for each of the device groups. Electrical information is determined for each reference device, and treated as representative electrical information for the devices in the corresponding group. Based on the determined hotspots, physical verification rules or schematic design recommendations may be generated, and the hotspots corrected.

DETAILED DESCRIPTION OF THE INVENTION

General Considerations

Figure 1:
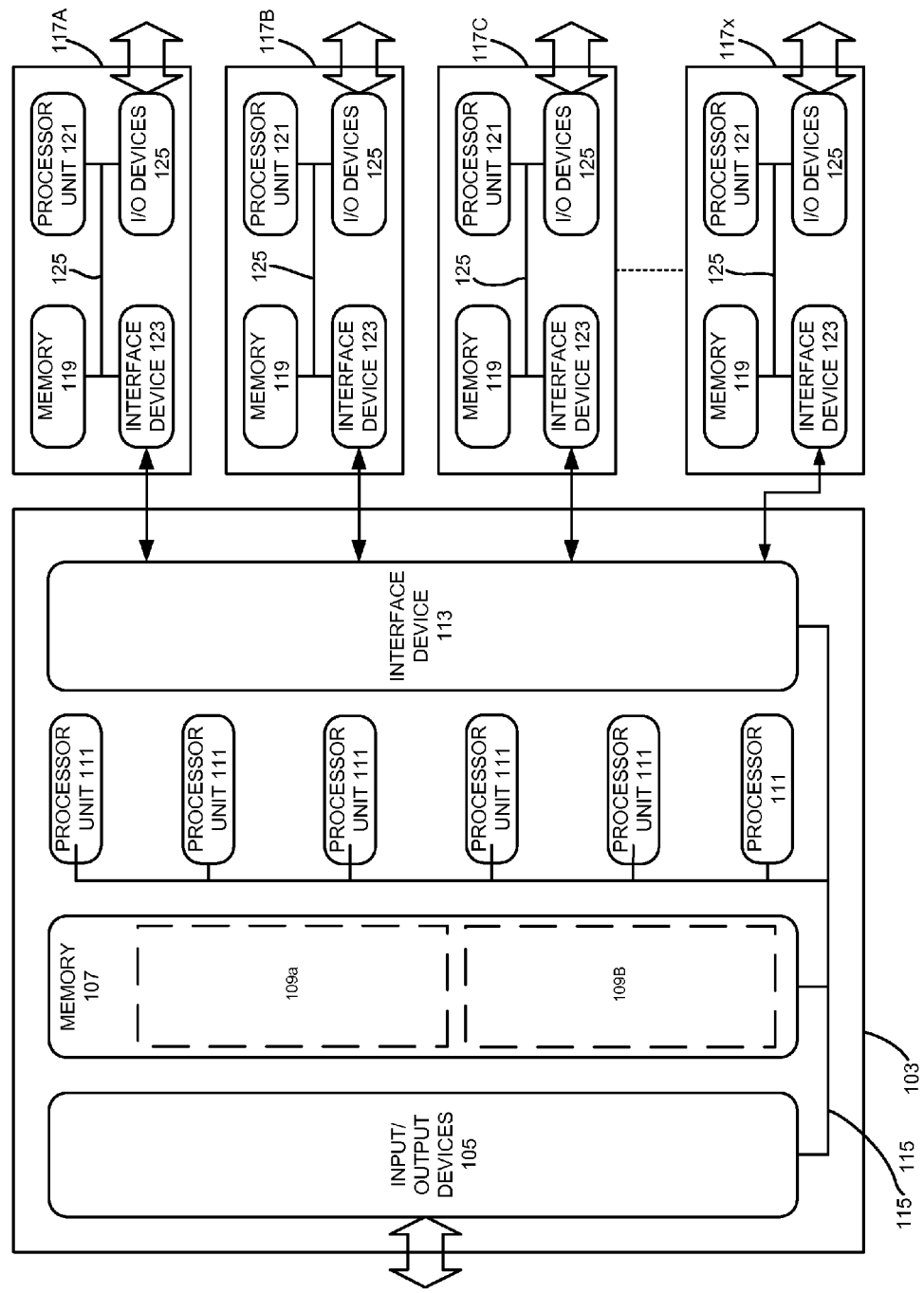
FIG. 1 illustrates an example of a computing system that may be used to implement various embodiments of the invention.

Various aspects of the present invention relate to detecting hotspots in a circuit design. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "generate," "extract," "place," "group," and "determine" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
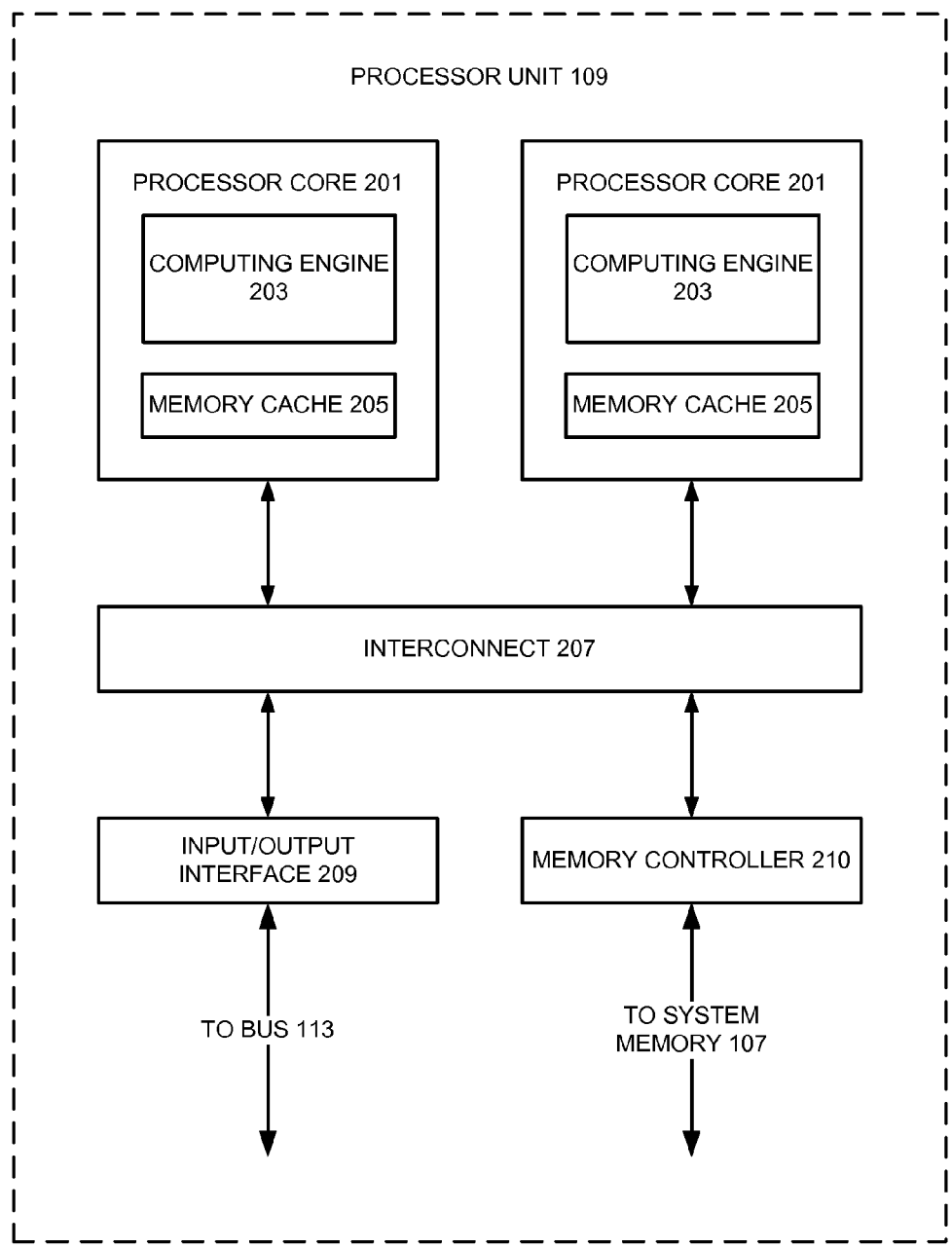
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C ... 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Hotspot Determination Tools and Methods

Figure 3:
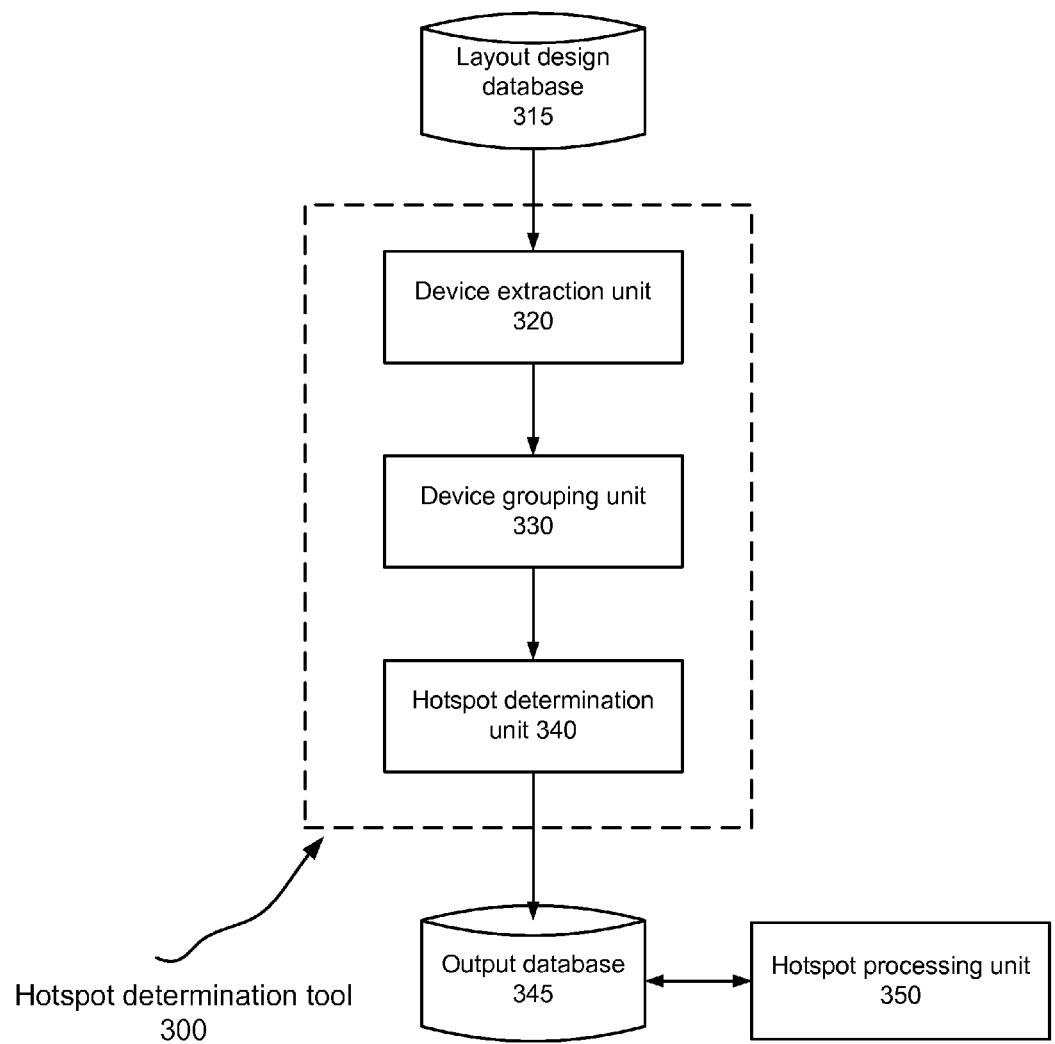
FIG. 3 illustrates an example of a hotspot determination tool according to various embodiments of the invention.

FIG. 3 illustrates an example of a hotspot determination tool 300 according to various embodiments of the invention. As seen in the figure, the hotspot determination tool 300 includes three main units: a device extraction unit 320, a device grouping unit 330 and a hotspot determination unit 340. As will be discussed in more detail below, some implementations of the hotspot determination tool 300 may cooperate with (or incorporate) one or more of a layout design database 315, an output database 345, and a hotspot processing unit 350. While the layout design database 315 and the output database 345 are shown as separate units in FIG. 3, a single data storage medium may be used to implement some or all of these databases.

According to some embodiments of the invention, one or more of the device extraction unit 320, the device grouping unit 330, the hotspot determination unit 340 and the hotspot processing unit 350 may be implemented by executing programming instructions on one or more programmable computers/computer systems, such as the computing system illustrated in FIG. 1 and FIG. 2. Correspondingly, some other embodiments of the invention may be implemented by software instructions, stored on a non-transitory computer-readable medium, for instructing one or more programmable computers/computer systems to perform the functions of one or more of the device extraction unit 320, the device grouping unit 330, the hotspot determination unit 340 and the hotspot processing unit 350. As used herein, the term "non-transitory computer-readable medium" refers to computer-readable medium that are capable of storing data for future retrieval, and not just propagating electro-magnetic waves. The non-transitory computer-readable medium may be, for example, a magnetic storage device, an optical storage device, a "punched" surface type device, or a solid state storage device.

Figure 4:
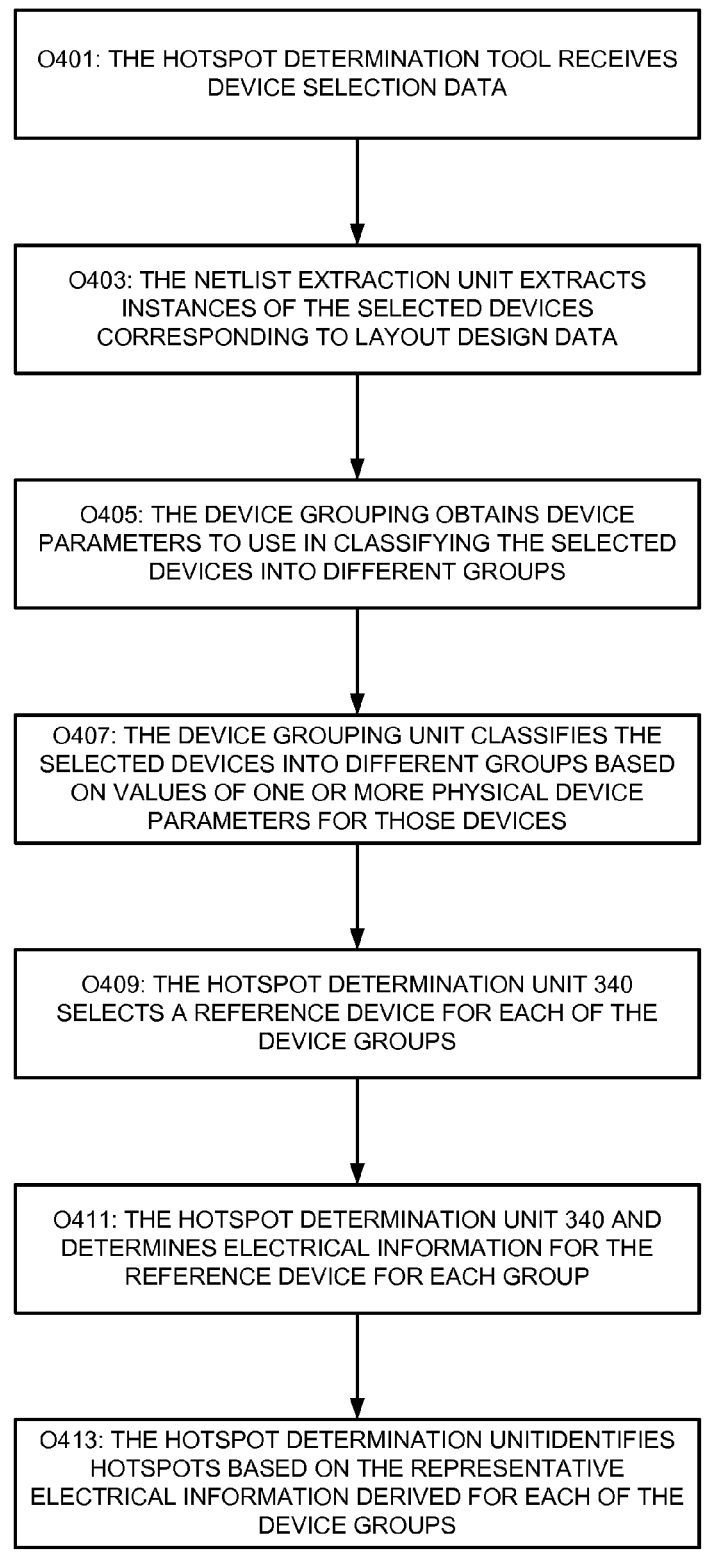
FIG. 4 illustrates an example of a flow chart for hotspot determination methods according to various embodiments of the invention.

For ease of understanding, hotspot determination methods that may be employed according to various embodiments of the invention will be described with reference to the hotspot determination tool 300 illustrated in FIG. 3 and the method of determining hotspots shown in the flowchart illustrated in FIG. 4. It should be appreciated, however, that alternate implementations of a hotspot determination tool may be used to perform the hotspot determination methods according to various embodiments of the invention. In addition, it should be appreciated that implementations of the hotspot determination tool 300 may be employed with other methods for determining hotspots according to different embodiments of the invention.

Initially, in operation 401, the hotspot determination tool 300 receives device selection data, selecting which devices will be examined for hotspots by the hotspot determination tool 300. Next, in operation 403, the device extraction unit 320 extracts instances of the selected devices corresponding to layout design data, which may be retrieved from the layout design database 315.

According to various examples of the invention, a netlist description of the electronic circuit may be extracted from the layout design data. To extract a netlist from the received layout data, a conventional layout versus schematic (LVS) tool may be employed. One example of such an LVS tool is the Calibre® family of software applications available from Mentor Graphics Corporation of Wilsonville, Oreg. With these implementations, the user may provide netlist data selecting the devices in an electronic circuit design to be examined for hotspot occurrences. If the input netlist data is extracted netlist data (i.e., extracted from the layout design data), then the device extraction unit 320 can extract the devices directly from the layout design data. If, however, the input netlist data is source netlist data (e.g, obtained from a schematic design of the electronic circuit), then the device extraction unit 320 will compare the extracted netlist data with the input netlist to identify portions that match the input netlist data. The device extraction unit 320 will then extract the devices from the layout design data based upon the matching portions of the extracted netlist data. With various embodiments of the invention, the extracted netlist data may be extracted from the layout design data by the device extraction unit 320, by an external netlist extraction tool, or some combination thereof.

Some implementations of the invention may alternately or additionally allow a user to select devices for analysis using layout design data input. With these implementations of the invention, the device extraction unit 320 may employ a pattern recognition tool to identify occurrences of the selected device in the layout design data for the electronic circuit. Still further, some implementations of the invention may allow a user to select devices based upon specified criteria, such as devices of a particular type occurring within a specified region of the design, devices of a particular type that were added to the design at a particular time or by a particular user, etc. Still further, some implementations of the invention may be preconfigured to analyze a specific type or types of devices (such as transistors), omitting or supplementing the need to receive input data selecting devices for analysis.

The device grouping unit 330 is configured to classify selected devices into different groups based on values of one or more physical device parameters for those devices. Accordingly, in operation 405, the device grouping obtains device parameters to use in classifying the selected devices into different groups. Next, in operation 407, the device grouping unit 330 classifies the selected devices into different groups based on values of one or more physical device parameters for those devices. Because device parameters usually determine a device's electrical performance, devices in each device group will have similar electrical performance. The selected devices may be transistors, as mentioned above. Two important device parameters for transistors are channel length and width, which are also referred to as gate length and width. These two parameters affect many important electrical parameters of a transistor. For example, the transistor threshold voltage decreases as the channel length decreases but increases as the channel width decreases.

In addition to the gate length and width, the SA and SB parameters may also affect a transistor's electrical performance. The SA and SB parameters are average distance between gate edges and diffusion edges measured from the left and right sides, respectively. These two parameters may be used to account for the proximity effect of nearby transistors in the layout design. Of course, in addition or alternative to the channel length, channel width, SA and SB parameters mentioned above, any other desired device parameter or parameters can be can be employed to group devices, such as area drain capacitance and area source capacitance. Also, it should be appreciated that, in addition or alternate to transistors, other types of devices may be identified and grouped, such as capacitors, resistors, diodes, etc. Still further, larger devices that incorporate transistors, such as memory circuits, power regulators, etc., also may be identified and grouped. As will be appreciated by those of ordinary skill in the art, each type of device may be associated with its own set of relevant parameters that can be used to categorize and group instances of that type of device.

The device grouping unit 330 may either select device parameters or receive a list of device parameters for grouping devices. The selection may, for example, depend upon the type of hotspots that need to be detected or the electrical properties of interest. For example, if the transistor saturation current is of interest, channel length, channel width, SA and SB parameters may be selected. As will be discussed in more detail below, when the device parameters for grouping devices are determined, the device grouping unit 330 will extract the device parameter values from the layout data for each selected device extraction In some embodiments of the invention, a lithography simulation tool can be used to derive some device parameters such as the channel length and width by simulating the printed contours for a device. Alternatively or additionally, some device parameter values may be derived from a pre-calculated look-up table provided by a chip manufacturer. Based on the device parameter values, the device grouping unit 330 categorizes devices in the netlist into device groups. Devices in each device group do not need to have the exact same parameter values. Instead, some tolerance (a device parameter value range) for each device parameter may be set. The tolerance for a parameter may be set, for example, based on the sensitivity of the electrical behavior of a transistor with respect to that parameter. Other factors such as computation speed may also be used as a factor for the tolerance determination.

Once the devices are grouped, the hotspot determination unit 340 determines hotspots based on the electrical information for the device groups. More particularly, in operation 409 the hotspot determination unit 340 selects a reference device for each of the device groups. Next, in operation 411, the hotspot determination unit 340 determines electrical information for the reference device for each group. Because devices in a device group share similar device parameter values, the electrical information determined for the reference device of the device group can be treated as representative for all the devices in the device group.

With various examples of the invention, the representative electrical information will be or include electrical characteristics for the reference device. For example, with some embodiments of the invention, the hotspot determination unit 340 may use equations or models to calculate the electrical information based on some known equations or models. Fathy et al., "A Parametric DFM CAD Solution For Analog Circuits: Electrical Driven Hotspot Detection, Analysis And Correction Flow," 24th IEEE International SOC Conference, 2011, which is incorporated herein by reference, describes some models that may be employed by various implementations of the invention for calculating the saturation current $I_{dsat}$, the threshold voltage $V_{th}$ and the carrier mobility. Alternatively, the electrical information can be obtained by performing a SPICE simulation on a minimized netlist that includes the reference device. It should be appreciated that the above three electrical parameters are just examples and that any desired electrical information such as information related to timing may also be obtained and used.

Next, in operation 413, the, the hotspot determination unit 340 identifies hotspots based on the representative electrical information derived for each of the device groups. More particular, a hotspot device group is determined when the electrical information for the representative device of that group deviates from the user-specified constraints. Each member of that group is then identified as a hotspot in the electronic device design. The user-specified constraints may be provided directly by a user. Alternatively or additionally, the user-specified constraints may be extracted from the respective schematic netlist.

Information regarding the identification of devices in the hotspot device groups may be output to a user, (i.e., as printed material, rendered on a display, or some combination of both), stored on a computer-readable medium, or some combination of both. For example, with various implementations of the invention, the identified hotspot devices may be provided to a graphical user interface, such as the Calibre RVE tool provided by Mentor Graphics Corporation. A user may then manually modify the electronic circuit design data (either in layout format or schematic format, or some combination of both) to address the design deviations associated with identified hotspot devices.

Alternately or additionally, various implementations of the invention may provide a list (e.g., a text list file) of identified hotspot devices to another electronic design process for modification of the electronic circuit design data (either in layout format or schematic format, or some combination of both) to address the design deviations associated with identified hotspot devices. For example, as noted above, the hotspot determination tool 300 may cooperate with (or incorporated) a hotspot processing unit 350. The hotspot processing unit 350 may then be configured to modify the layout design to correct the hotspots by, e.g., changing the widths or lengths of relevant geometric elements. Alternately or additionally, in some embodiments of the invention, the hotspot processing unit 350 may be configured to generate physical verification rules based on the information of the hotspots, which rules may be used by, e.g., electronic design automation verification tools to analyze electronic circuit designs. In still other embodiments of the invention, the hotspot processing unit 350 may alternately or additionally be configured to generate schematic design recommendations based on the information of the hotspots.

As will be appreciated by those of ordinary skill in the art, various embodiments of the invention, as described above, allow a designer to identify potential problem devices without having to simulate the operation of each of those devices or the whole design.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method of hotspot determination, comprising:
receiving layout data for a layout design;
extracting, using a computer, a netlist from the layout design;
classifying devices in the netlist into device groups based on values for one or more device parameters derived from the layout data, the one or more device parameters describing one or more physical parameters of the devices corresponding to electrical information for the devices in the device groups;
determining hotspots based on the electrical information for the device groups; and
storing information of the hotspots in a tangible medium.

2. The method recited in claim 1, further comprising:
generating physical verification rules based on the information of the hotspots.

3. The method recited in claim 1, further comprising:
correcting the hotspots.

4. The method recited in claim 1, further comprising:
generating schematic design recommendations based on the information of the hotspots.

5. The method recited in claim 1, wherein the devices are transistors.

6. The method recited in claim 1, wherein the one or more device parameters are selected based on electrical properties of interest.

7. The method recited in claim 1, wherein the one or more physical parameters comprises one or more physical parameters selected from channel width, channel length, SA parameter, or SB parameter.

8. The method recited in claim 1, wherein the determining hotspots comprises:
selecting a reference device for each of the device groups;
determining representative electrical information for the reference device for each of the device groups; and
identifying hotspots based on the representative electrical information.

9. A non-transitory processor-readable medium storing processor-executable instructions for causing one or more processors to perform a method of hotspot determination, the method comprising:
receiving layout data for a layout design;
extracting a netlist from the layout design;
classifying devices in the netlist into device groups based on values for one or more device parameters derived from the layout data, the one or more device parameters describing one or more physical parameters of the devices corresponding to electrical information for the devices in the device groups;

determining hotspots based on the electrical information for the device groups; and storing information of the hotspots in a tangible medium.

10. The non-transitory processor-readable medium recited in claim 9, wherein the method further comprises:

generating physical verification rules based on the information of the hotspots.

11. The non-transitory processor-readable medium recited in claim 9, wherein the devices are transistors.

12. The non-transitory processor-readable medium recited in claim 9, wherein the one or more physical parameters comprises one or more physical parameters selected from channel width, channel length, SA parameter, or SB parameter.

13. The non-transitory processor-readable medium recited in claim 9, wherein the determining hotspots comprises:

selecting a reference device for each of the device groups;

determining representative electrical information for the reference device for each of the device groups; and identifying hotspots based on the representative electrical information.

14. A system comprising one or more processors, the one or more processors programmed to perform a method of hotspot determination, the method comprising:

receiving layout data for a layout design;

extracting a netlist from the layout design;

classifying devices in the netlist into device groups based on values for one or more device parameters derived from the layout data, the one or more physical parameters describing one or more physical parameter of the devices corresponding to electrical information for the device in the device groups;

selecting a reference device for each of the device groups;

determining representative electrical information for the reference device for each of the device groups;

identifying hotspots based on the representative electrical information; and storing information of the hotspots in a tangible medium.

15. The system recited in claim 14, wherein the method further comprises:

generating physical verification rules based on the information of the hotspots.

16. The system recited in claim 14, wherein the devices are transistors.

17. The system recited in claim 14, wherein the one or more physical parameters comprises one or more physical parameters selected from channel width, channel length, SA parameter, or SB parameter.

18. A non-transitory processor-readable medium storing processor-executable instructions for causing one or more processors to perform a method of hotspot determination, the method comprising:

receiving layout data for a layout design;

extracting a netlist from the layout design;

classifying devices in the netlist into device groups based on values for one or more physical device parameters derived from the layout data, the one or more physical parameters corresponding to electrical information for the devices;

selecting a reference device for each of the device groups;

determining representative electrical information for the reference device for each of the device groups;

identifying hotspots based on the representative electrical information; and storing information of the hotspots in a tangible medium.

19. The method recited in claim 1, wherein the devices in each device group have similar electrical performance.

20. The non-transitory processor-readable medium recited in claim 9, wherein the devices in each device group have similar electrical performance.

* * * * *